(12) United States Patent
Kawata et al.

(10) Patent No.: US 6,600,116 B2
(45) Date of Patent: Jul. 29, 2003

(54) SWITCH MOUNTING STRUCTURE

(75) Inventors: Hisao Kawata, Saitama (JP); Naoshi Uchida, Saitama (JP); Katsunori Kuboyama, Saitama (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 10/050,037

(22) Filed: Jan. 17, 2002

(65) Prior Publication Data

US 2002/0096422 A1 Jul. 25, 2002

(30) Foreign Application Priority Data

Jan. 19, 2001 (JP) ........................................ 2001-011639

(51) Int. Cl.[7] .............................. H01H 1/64; H01H 1/66; H01H 13/04; H01H 13/08; H01H 13/10
(52) U.S. Cl. ........................ 200/293; 200/306; 361/652
(58) Field of Search .................................. 200/293, 294, 200/296, 306; 335/8–10; 361/652–656, 673, 809, 810, 825; 219/157

(56) References Cited

U.S. PATENT DOCUMENTS 3,398,249 A    8/1968 Dessert
4,549,153 A *  10/1985 Forsell et al. .................. 335/16
5,694,288 A *  12/1997 Shortt et al. .................. 361/673
5,753,878 A *  5/1998  Doughty et al. ............. 218/157
5,943,207 A *  8/1999  Kim ............................. 361/673
6,188,036 B1 * 2/2001  Arnold ........................ 218/157
6,317,019 B1 * 11/2001 Herpin et al. ................... 335/8
6,426,688 B1 * 7/2002  DeVizzi et al. ............... 335/16

FOREIGN PATENT DOCUMENTS

DE    1 177 710    9/1964
DE    33 28 305    2/1985

* cited by examiner

*Primary Examiner*—Elvin Enad
*Assistant Examiner*—K. Lee
(74) *Attorney, Agent, or Firm*—Kanesaka & Takeuchi

(57) ABSTRACT

A mounting structure for mounting a switch device includes a main body case for the switch device having slots formed in lower portions of the front and rear surfaces, and mounting plates to be inserted into the slots. Each mounting plate has a screw hole at one end and an insertion portion at the other end The insertion portions are inserted into the slots to allow the main body case to be fixed by the mounting plates. The switch can be mounted using screws inserted into the screw holes in the mounting plates.

6 Claims, 4 Drawing Sheets

Fig. 1(a)
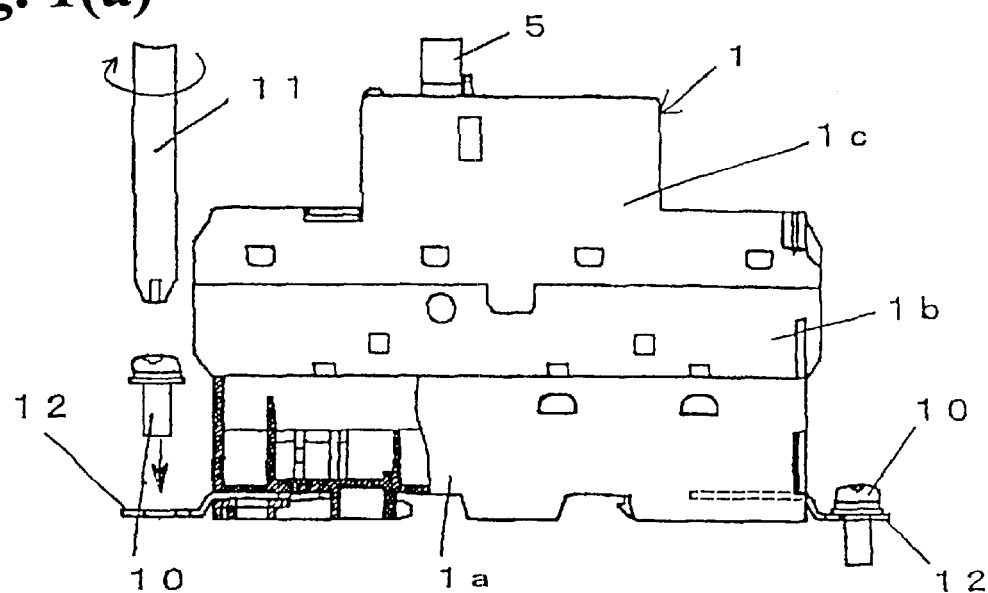
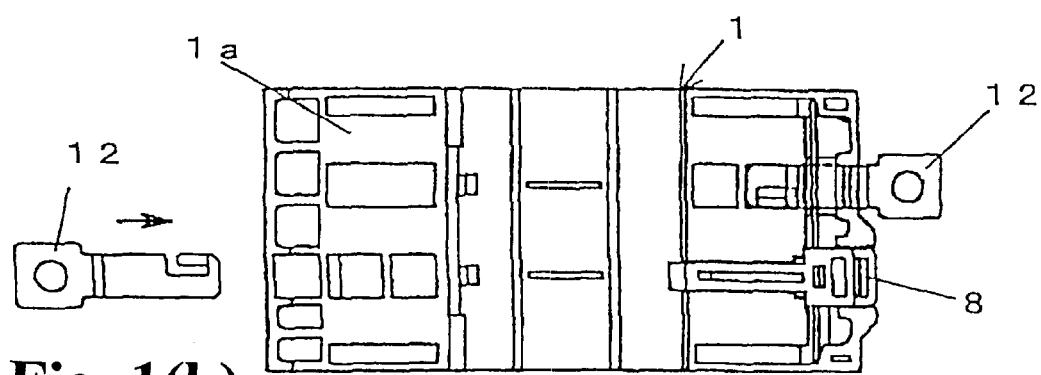
Fig. 1(b)
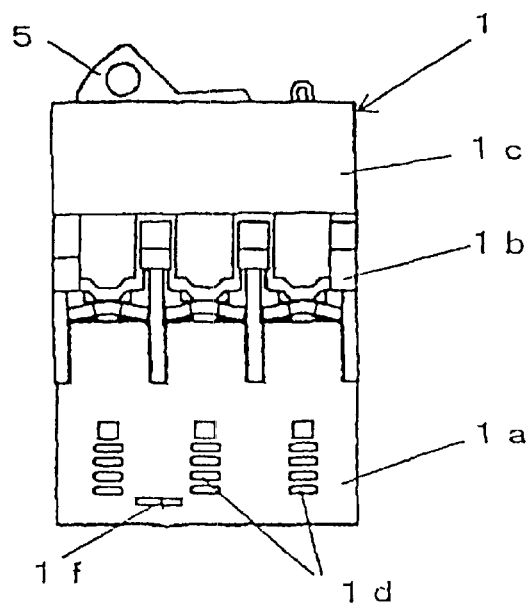
Fig. 1(c)

SWITCH MOUNTING STRUCTURE

BACKGROUND OF THE INVENTION AND RELATED ART STATEMENT

The present invention relates to a mounting structure for a switch device such as a breaker or an electric leakage breaker.

As an example, an internal structure and a mounting structure of a breaker are described with reference to the following drawings. FIG. 4 is a view illustrating an assembled structure of a breaker. Reference numeral 1 denotes a main body case having a three-piece structure including a lower case 1a, an intermediate case 1b. and an upper case 1c. The main body case 1 is internally provided with a main circuit breaking section 2, a switching mechanism section 3, an over current detecting section 4, a switching handle 5, a power supply side and a load side main circuit terminals 6 and 7, and others. Reference numeral 1d denotes vent slots for the breaking section 2 that are opened in the front and rear surfaces of the lower case 1a so as to correspond to the respective poles of the breaking section 2.

Further, to allow the breaker to be mounted on a support rail laid in a switchboard or the like, the main body case 1 is equipped with a rail groove that fits into a support rail 9 and an engaging slider 8 that projects to the rail groove. Reference numeral 8a denotes an urging spring for the slider 8.

Furthermore, in addition to this rail mounting mechanism, to allow the breaker to be mounted directly on a switchboard or the like using screws without the support rail, an recess portion 1e is conventionally formed in each of the front and the rear surface of the lower case 1a so as to form a screw seat 1e-1, as shown in FIG. 7. The screw seat is formed at a location of the corresponding recess portion in order to eliminate a projection from the main body case 1 to provide compact construction.

Then, to mount a breaker using screws without a support rail, a setscrew 10 is inserted into the screw seat 1e-1 and then screwed thereinto using a screwdriver 11.

The conventional screw mounting structure of the switch device involves the following problems:

(1) The screw hole in the screw seat 1e-1 is opened inwardly of the corresponding end surface of the main body case 1. Accordingly, to mount the switch using the screws, the screwdriver must be inclined during handling the setscrew, as illustrated in FIG. 7. This makes it difficult to tighten the screw, and threads on a screw head may be tore down when the screw is tightened with a strong force thereto.

(2) Further, the setscrew 10 is located at substantially the same height as the vent slots 1d opened in the corresponding surface of the main body case 1. Therefore, a gas ejected from the breaking section through the vent slots 1d is blown against the setscrew 10 when the breaker current is interrupted. As a result, the switch may fail the ground voltage test conducted at an operation site.

The present invention has been made in view of these problems, and it is an object thereof to solve these problems in order to provide an improved switch mounting structure that allows an operator to handle a tool easily and safely upon mounting a switch using screws.

It is another object of the invention that the switch stands the ground voltage test after long usage.

Further objects and advantages of the invention will be apparent from the following description of the invention.

SUMMARY OF THE INVENTION

To attain the above objects, the invention provides a mounting structure for mounting a switch device using screws, which is otherwise mounted on a support rail without screws. A switch device comprises a main body case that is provided with a main circuit breaking section, a switching mechanism section and the like internally. The main body case also has slots for inserting mounting plates in a front bottom surface and a rear bottom surface thereof. When the switch device is mounted using the screws, a mounting plate with a screw hole is inserted into a corresponding slot. The mounting plate engages and is locked to the main body case, so that the switch can be mounted by using the screw inserted into the screw hole in the mounting plate (the first aspect of the invention).

Specifically, the slot and the mounting plate are formed in the following manner:

(1) The slot is formed apart from vent holes of the main circuit breaking section that are opened in the front and the rear surface of the main body case (the second aspect of the invention)

(2) The mounting plate has an arm portion extending away from the screw hole, and has a hook-shaped claw portion at a tip of the arm portion. The claw portion engages and is locked to an engaging stage portion of the main body case when the arm portion of the mounting plate is inserted into the slot in the main body case (the third aspect of the invention).

With the above construction, when the mounting plate is installed on the main body case, the screw hole is located away from a sidewall of the main body. Accordingly, when the switch is mounted by using screws, an operator can use a screwdriver vertically and tighten a setscrew in such a way that the operation is not obstructed by the main body case.

Further, since the slot is formed apart from the vent slots in the main body case, a gas from the vent is released away from the mounting plate. Thus, the switch device withstands the ground voltage test after long usage, which is conducted in an actual use state where the switch device is mounted in a switchboard.

The mounting plate of the above structure, which is used as an accessory of the switch device, can be installed on the main body case with a single insertion motion. In the installed position, the claw portion of the mounting plate engages the engaging stage portion of the main body case, thereby preventing the mounting plate from inadvertently slipping off the main body case. Further, by pushing the claw portion from the bottom surface of the main body case to disengage the claw portion from the engaging stage portion, the switch can be pulled out from the main body case. Accordingly, when the switch device needs to be mounted on a support rail later, the mounting plate can easily be removed from the main body case.

BRIEF DESCRIPTION OF THE DRAWINGS

FIG. 1(a)–FIG. 1(c) are illustrating a mounting structure of an embodiment of the present invention, wherein FIG. 1(a) is a side view of a switch device, FIG. 1(b) is a bottom view thereof, and FIG. 1(c) is an end view thereof without a mounting plate;

FIG. 3(a) and FIG. 3(b) show the mounting plate shown in FIGS. 1(a) and 1(b), wherein FIG. 3(a) is a top view and FIG. 3(b) is a side view;

DETAILED DESCRIPTION OF PREFERRED EMBODIMENTS

Hereunder, embodiments of the invention will be described with reference to the accompanying drawings. In an embodiment shown in FIG. 1(a) to FIG. 1(c), a lower case 1a of a main body case 1 has slots 1f provided at front and rear bottom surfaces, i.e. front and rear lower surfaces, of the main body case (to which main circuit terminals are also attached). A mounting plate 12 is inserted into the slot.

Figure 3A:
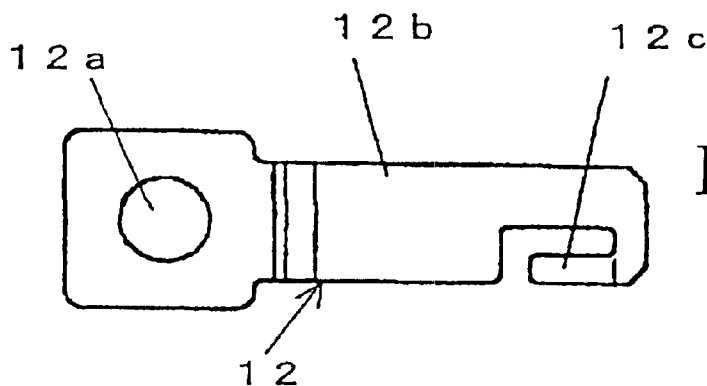
Figure 3B:
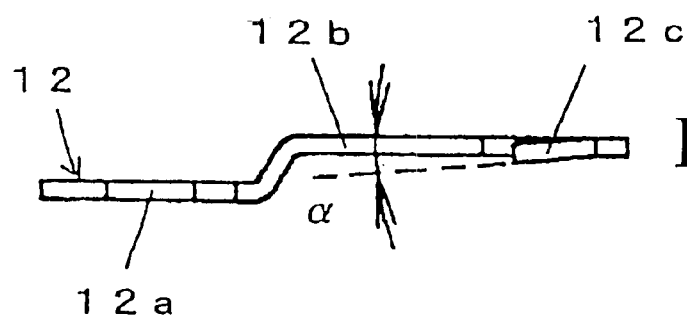

In this case, the slot 1f is opened apart from vent slots or holes 1d disposed in side surfaces of the lower case 1a. The mounting plate 12 is a press molded metal plate with elasticity and has a hole 12a at one end thereof, an arm portion 12b extending toward the other end, and a hook-shaped claw portion 12c formed at the tip of the arm portion 12b by stamping. The claw portion 12c is bent downwardly (folding angle α) so that the tip of the claw portion projects from a plate surface of the arm portion, as shown in FIGS. 3(a) and 3(b).

Figure 2:
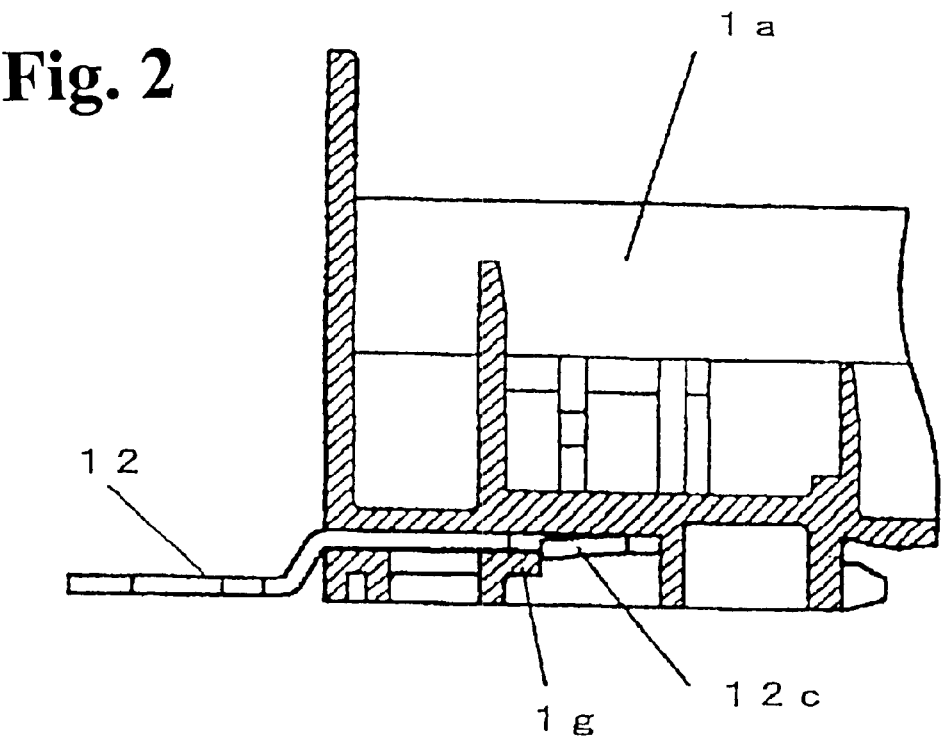
FIG. 2 is an enlarged sectional view of a part of the switch device with the mounting plate in FIG. 1(a)
Figure 4:
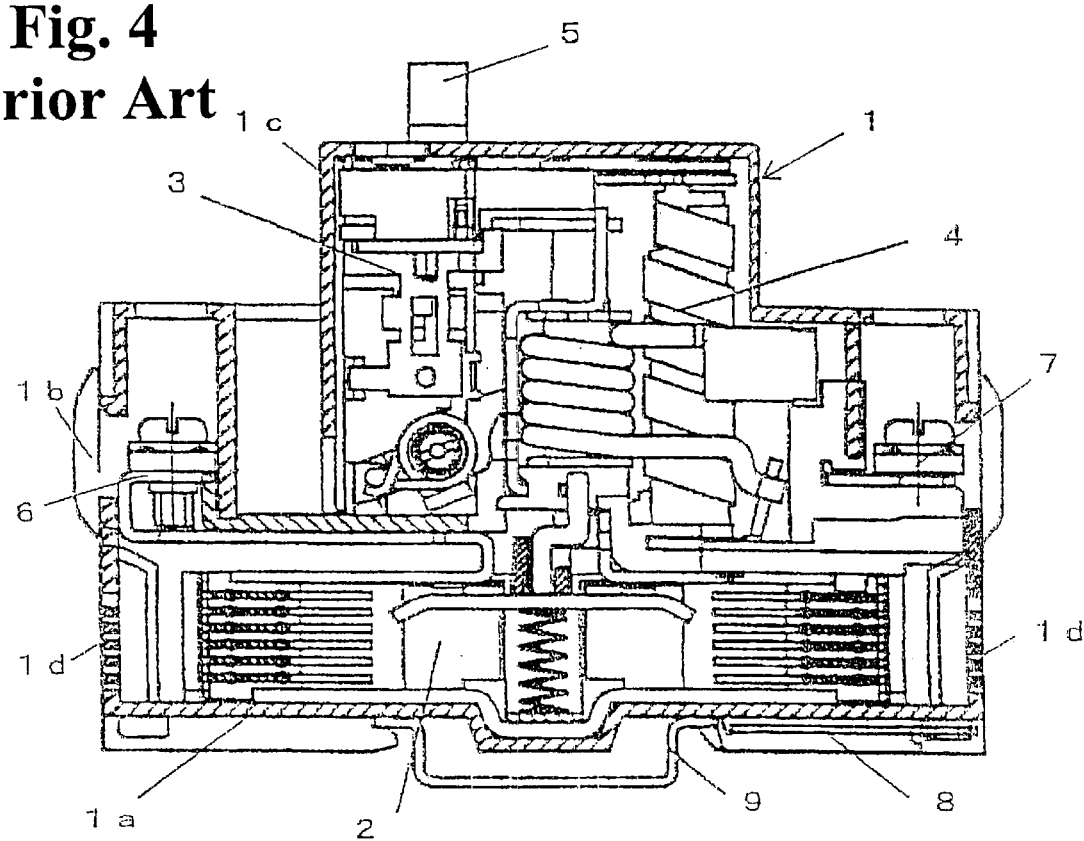
FIG. 4 shows a sectional view of a conventional breaker as an example in which the present invention is implemented.
Figure 5:
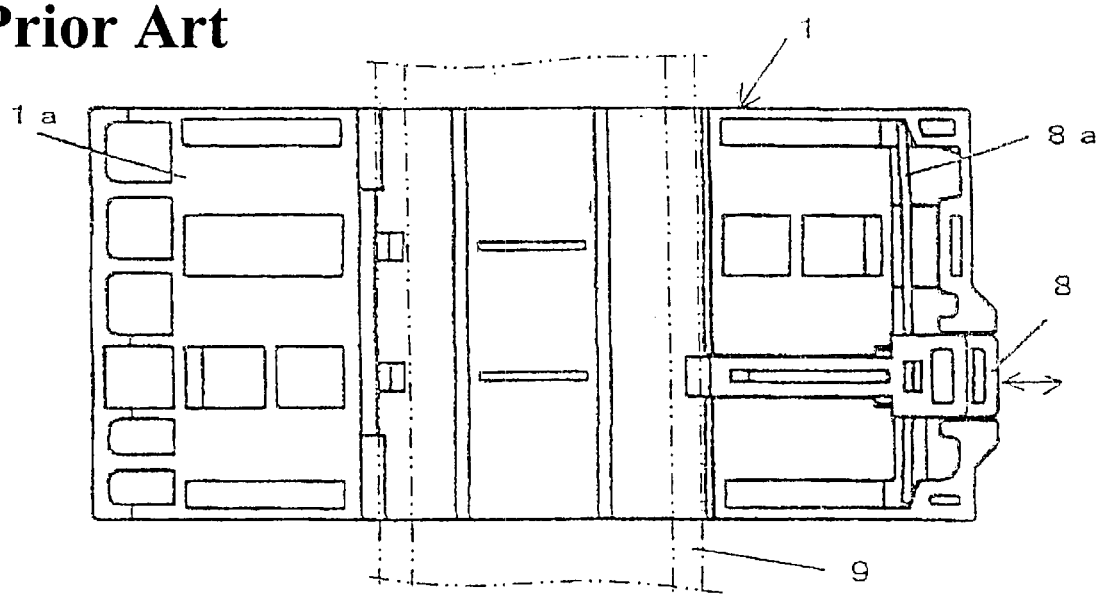
FIG. 5 is a bottom view of the breaker in FIG. 4.
Figure 6:
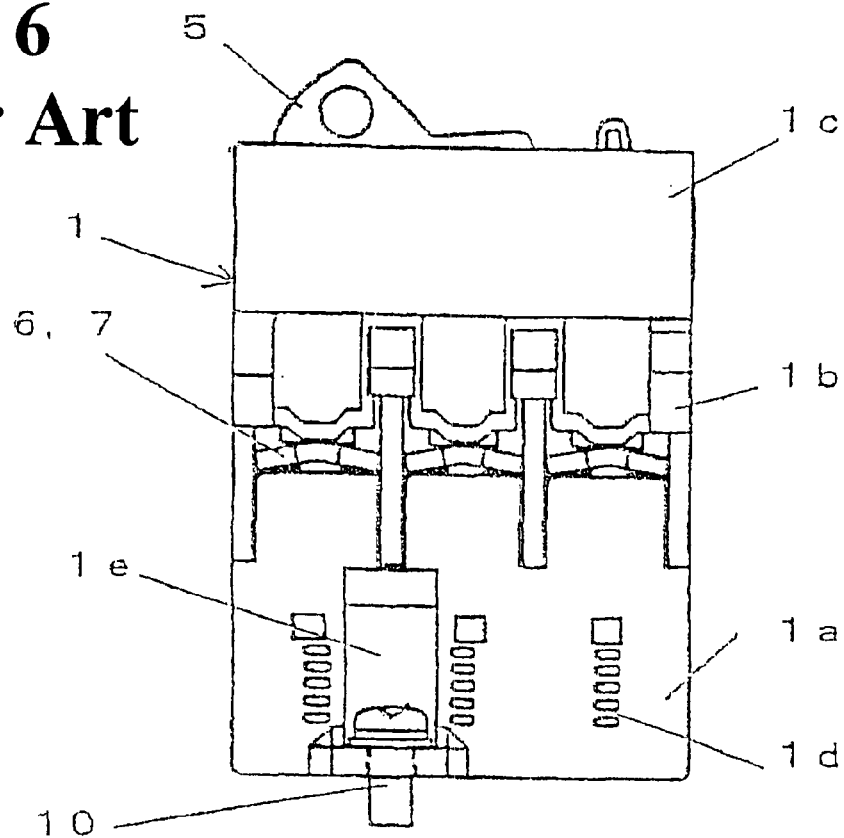
FIG. 6 is an end view of a switch with a conventional mounting structure.
Figure 7:
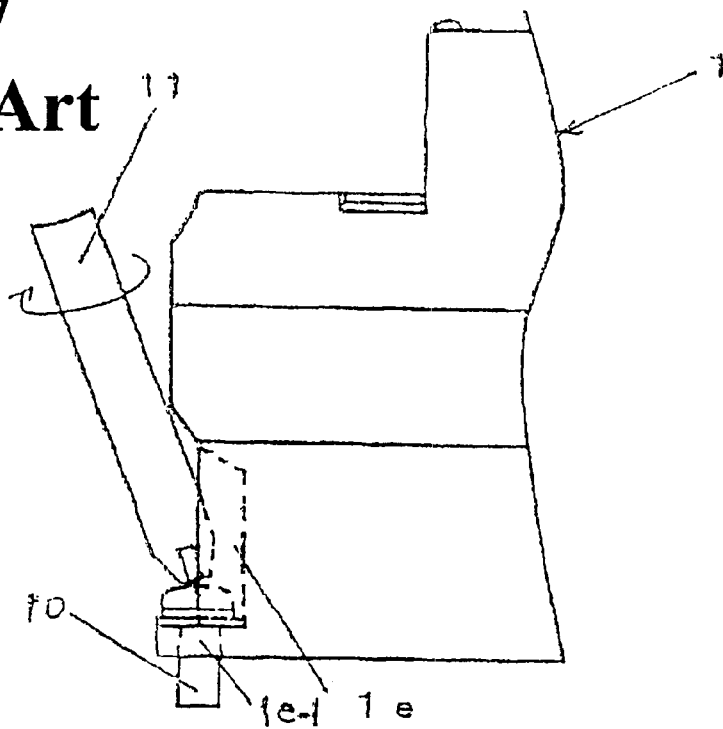
FIG. 7 illustrates a mounting operation of the conventional mounting structure in FIG. 6.

To mount the breaker (a switch device) directly on a switchboard using screws, not a support rail 9 in FIG. 4, the arm portions 12b of the mounting plates 12 are inserted and pushed into the slots if, opened in the front and the rear end surface of the main body case 1. Once the mounting plate 12 is pushed to a specified position, the claw portion 12c snaps back to its original form due to its elasticity and is caught on an engaging stage portion 1g formed on the bottom surface of the lower case la as shown in FIG. 2. The claw portion 12c thus engages and is locked to the engaging stage portion so as not to slip out from this position.

In this state, a setscrew 10 is inserted into the hole in the mounting plate, projecting from the main body case 1 as shown in FIG. 1(a), and is then tightened by using the screwdriver 11. This operation can be performed with the screwdriver 11 positioned vertically and without obstruction by the main body case 1, as shown in the figure. This prevents oblique movement of the screwdriver 11, which may cause a screw head of the setscrew 10 to be worn down. Consequently, a predetermined tightening torque (for example, 3 N·m) can be applied to reliably mount the switch device using the screws.

Further, in the actual use in which the breaker is mounted by using the screws, the mounting plate 12 and the setscrew 10 are located away from the vent slot 1d, opened in the side surface of the main body case 1. Therefore, they are not affected by gas ejected from the vent slots when current is interrupted, and the switch device sufficiently withstands the ground voltage test.

If the mounting plate 12, installed in the main body case 1, needs to be removed, the mounting plate 12 can easily be pulled out by pushing the claw portion 12c from the rear surface of the main body case 1 to disengage it from the engaging stage portion 1g.

As described above, according to the invention, by installing the mounting plate on the main body case of the switch device, the switch device can be mounted by using screws, thereby enabling the switch device to be mounted either on a standard rail or with using screws. Furthermore, the mounting plate enables the mounting operation to be performed by using a tool positioned vertically when the switch device is mounted by using screws. Accordingly, the switch device can be reliably tightened by the screws without causing a screw head to be worn down.

Further, since a slot, through which the mounting plate is inserted, is formed apart from vent slots of the breaking section, which are opened in the front and the rear surface of the main body case, the switch can withstand the ground voltage test after long usage.

Furthermore, the hook-shaped claw portion is formed at a tip of the arm portion of the mounting plate by stamping. With the mounting plate inserted into the slot in the main body case, the claw portion engages and is locked to the engaging stage portion of the main body case, thereby allowing the mounting plate to be easily mounted on or removed from the main body case.

Thus, when the switch device needs to be mounted on a standard rail, it is possible to remove the mounting plate from the main body case and then to mount the switch device on the support rails. This aspect makes the invention very practical.

While the invention has been explained with reference to the specific embodiments of the invention, the explanation is illustrative and the invention is limited only by the appended claims.

What is claimed is:

1. A mounting structure for mounting a switch device, comprising:

a main body case for the switch device having front and rear surfaces, vent holes formed at the front and rear surfaces laterally spaced away from each other, and slots formed in lower portions of the front and rear surfaces away from the vent holes between the vent holes; and mounting plates to be inserted into said slots, each mounting plate having a screw hole at one end and an insertion portion at the other end thereof, said insertion portions being inserted into the slots to thereby allow the main body case to be fixed by the mounting plates.

2. A mounting structure according to claim 1, wherein said main body has engaging stage portions inside the main body case communicating with the slots, and said mounting plate has an engaging claw at the insertion portion to engage the engaging stage portion.

3. A mounting structure according to claim 2, wherein said engaging claw inclines relative to said one end with the screw hole.

4. A mounting structure according to claim 3, wherein said main body case includes at least one main circuit breaking section, and an opening-and-closing mechanism section therein.

5. A mounting structure for mounting a switch device, comprising:

a main body case for the switch device having front and rear surfaces, slots formed in lower portions of the front and rear surfaces, and engaging stage portions formed inside the main body case and facing the slots, and mounting plates to be inserted into said slots, each mounting plate having a screw hole at one end, and an insertion portion with an engaging claw at the other end thereof, said engaging claw having a free end engaging the engaging stage portion to prevent the mounting plate from disengaging from the slot when the insertion portion is inserted into the slot so that the main body case can be fixed by the mounting plates.

6. A mounting structure according to claim 5, wherein said engaging claw is located at a side of the insertion portion and inclines relative to the insertion portion so that the free end is directed to the screw hole and spaced from the insertion portion.

* * * * *

UNITED STATES PATENT AND TRADEMARK OFFICE
CERTIFICATE OF CORRECTION

PATENT NO.    : 6,600,116 B2
DATED         : July 29, 2003
INVENTOR(S)   : Hisao Kawata et al.

It is certified that error appears in the above-identified patent and that said Letters Patent is hereby corrected as shown below:

<u>Title page,</u>
Item [57], ABSTRACT,
Line 6, after "end" add -- thereof. --;
Line 7, before "allow" add -- thereby --; and <u>Column 3,</u>
Line 33, change "if" to -- 1f --.

Signed and Sealed this

Seventh Day of October, 2003

JAMES E. ROGAN
*Director of the United States Patent and Trademark Office*